(12) United States Patent
Giliberti

(10) Patent No.: US 10,764,553 B2
(45) Date of Patent: Sep. 1, 2020

(54) IMMERSIVE DISPLAY SYSTEM WITH ADJUSTABLE PERSPECTIVE

(71) Applicant: NUMBER 9, LLC, New York, NY (US)

(72) Inventor: James Joseph Giliberti, San Francisco, CA (US)

(73) Assignee: Number 9, LLC, New York, NY (US)

( * ) Notice: Subject to any disclaimer, the term of this patent is extended or adjusted under 35 U.S.C. 154(b) by 0 days.

(21) Appl. No.: 16/201,863

(22) Filed: Nov. 27, 2018

(65) Prior Publication Data

US 2020/0169710 A1 May 28, 2020

(51) Int. Cl.
| | |
|---|---|
| *H04N 13/117* | (2018.01) |
| *G06F 3/01* | (2006.01) |
| *H04N 13/383* | (2018.01) |
| *H04N 13/332* | (2018.01) |

(52) U.S. Cl.
CPC .......... *H04N 13/117* (2018.05); *G06F 3/013* (2013.01); *H04N 13/332* (2018.05); *H04N 13/383* (2018.05)

(58) Field of Classification Search
None
See application file for complete search history.

(56) References Cited

U.S. PATENT DOCUMENTS

| | | | |
|---|---|---|---|
| 2016/0210780 A1* | 7/2016 | Paulovich | G06T 7/73 |
| 2018/0234669 A1* | 8/2018 | Chen | H04N 5/23238 |
| 2018/0374192 A1* | 12/2018 | Kunkel | G06T 15/205 |
| 2019/0051051 A1* | 2/2019 | Kaufman | G06F 3/00 |
| 2019/0132575 A1* | 5/2019 | Izumi | H04N 13/161 |
| 2019/0164330 A1* | 5/2019 | Sugano | G02B 27/0172 |
| 2019/0204909 A1* | 7/2019 | Xiao | G06T 19/20 |
| 2019/0215505 A1* | 7/2019 | Ishii | H04N 13/156 |
| 2019/0238819 A1* | 8/2019 | Furukawa | G06T 15/205 |
| 2020/0007845 A1* | 1/2020 | Fukuyasu | H04N 13/178 |
| 2020/0027261 A1* | 1/2020 | Briggs | H04N 13/383 |

* cited by examiner

*Primary Examiner* — Ryan M Gray
(74) *Attorney, Agent, or Firm* — Fox Rothschild LLP

(57) ABSTRACT

An immersive display system with an adjustable perspective is provided herein. The immersive display system includes a viewing device suitable for displaying display information in an immersive environment, which is displayed relative to a virtual viewer position. The immersive display system includes an input device. The system also includes an image storage element that stores at least one photographic image. The immersive display system includes a processor configured to process the instructions for mapping the photographic image onto a 3-dimensional shape for display in an immersive environment on the viewing device. The system adjusts a virtual displayed position with respect to the virtual viewer position allowing for the viewer to experience the environment at a perspective different than the recorded perspective.

22 Claims, 14 Drawing Sheets

IMMERSIVE DISPLAY SYSTEM WITH ADJUSTABLE PERSPECTIVE

TECHNICAL FIELD

A system for displaying immersive content, more particularly, one that allows a viewer to change a virtual position within an immersive environment that displays two-dimensional, viewable information on a three-dimensional surface.

BACKGROUND 360-degree cameras (e.g., Ricoh Theta, Insta360, GoPro Fusion, Vuze VR Camera, etc.) capture panoramic pictures and videos (e.g., 180 degree and 360 degree). The panoramic pictures are created by assembling a number of separate pictures or video frames and combining them into a view of a scene that can be viewed by a viewer on a display. The result of this assembling of images/frames results in a full sphere (or hemisphere in the case of 180-degree content) that a viewer can view in a seemingly immersive environment. Rotation of the viewer's head allows for viewing of the image around the 180 or 360 degrees. This, however, places the viewer strictly at the center point to view the content. A viewer need only look up, down, left, right or even rotate his head to view the content.

The problem, however, is that content browsers assume that the camera center and the viewer content are in the same location. This is a natural implementation that represents a "what was captured is what is viewed". This approach introduces visual discontinuities with real-world behavior that can lead to discomfort for some viewers and nausea for others. The issue is that by locking the camera to the viewer, the only degrees of freedom that can be used are those of orientation (roll, pitch, yaw). The viewer, within the immersive view, can rotate around the center appropriately, but cannot move translationally. If the viewer moves into a new translational position (for example steps to the side or bends down to look more closely at an object) the entire viewable world moves with him (retaining the same viewable perspective regardless of the translation), causing objects to move in a non-intuitive way. For many people, this effect is so disconcerting that their bodies become rigid while viewing immersive content; therefore, the viewer decides to only move their head. Over time this lessens the enjoyment of the experience and may lead some viewers to lose interest, become sick, or in some instances injure themselves.

SUMMARY

In accordance with various embodiments, an immersive display system with an adjustable perspective is provided herein. The immersive display system may include a viewing device suitable for displaying display information in an immersive environment, which is displayed relative to a virtual viewer position. The immersive display system includes an input device. The system also includes an image storage element that stores at least one photographic image. The immersive display system includes a processor configured to process the instructions for mapping the photographic image onto a 3-dimensional shape for display in an immersive environment on the viewing device. The system adjusts a virtual displayed position with respect to the virtual viewer position allowing for the viewer to experience the environment at a perspective different than the recorded perspective.

In accordance with various embodiments, an immersive display system with adjustable perspective is provided. The immersive display system may include a viewing device suitable for displaying display information in an immersive environment relative to a recorded position that is separable from a virtual viewer position. The immersive display system may include an input device configured to adjust a relationship between the virtual viewer position and the recorded position. The immersive display system may include a non-transitory memory containing computer-readable instructions operable to display and adjust the display information in the immersive environment. The immersive display system may include an image storage element that stores at least one two-dimensional photographic image. The immersive display system may include a processor configured to process the instructions for carrying out the following steps for creating the immersive display system. The instructions may include mapping the at least one two-dimensional photographic image onto a three-dimensional shape having a reference dimension. The mapped image being for display in the immersive environment on the viewing device. The instructions may include displaying the mapped image in the immersive environment at a virtual display orientation corresponding to the virtual viewer position that is different than a display orientation corresponding to the recorded position providing a simulation of a change in position relative to the immersive environment.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

Figure 1A:
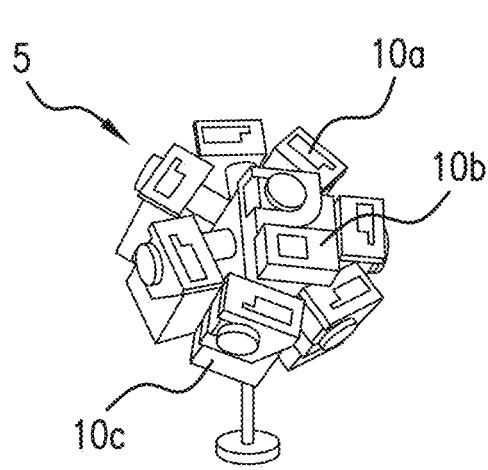
FIG. 1A-C illustrates separate examples of image or video capture rigs.

All figures are arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein and illustrated in the Figures, can be arranged, substituted, combined, separated, and designed in a wide variety of different configurations, all of which are implicitly contemplated herein.

A system for displaying photographic information in an immersive environment is provided herein. The immersive display system allows a viewer to change perspective relative to the displayed photographic information within an immersive environment. As used herein, photographic information relates an image based on a real-world recording. In particular examples, the real-world recording is achieved by exposing a photosensitive surface (e.g., photosensitive film or photosensitive chipset) to light. In various embodiments, the image is captured via one or more cameras. In some examples, the one or more cameras record multiple images or a video. In some examples, the one or more cameras record discrete or individual still images for display. In various embodiments, the image is based on two-dimensional information displayed in a three-dimensional immersive environment on a three-dimensional object therein. In particular examples, the image cam be a landscape image (e.g., a park or the like), a room (e.g. a conference room), or any other suitable environment that a viewer would be located for an immersive experience.

Viewing immersive panoramic content (180 and 360-degree photographs) can lead to visual stress, body fatigue and in some cases nausea. In various embodiments, the immersive display system disclosed herein simulates how a viewer sees the world and how the display content would change based on different viewing positions of the viewer.

In order to relieve the visual and perceptual stress involved in viewing immersive display information (e.g., two-dimensional 180/360-degree pictures/video) in an immersive display environment, the various aspects, embodiments, and/or examples described herein enables the separation of a recorded position in the virtual display from a viewer virtual position. The recorded position of display is the natural center of the immersive display based on the mapping algorithm of the image to the object. In various examples, this is based on the relationship between the capturing devices (e.g., one or more camera(s)) to the various images that makeup the display content.

The viewer virtual position of the virtual display represents the viewer's perspective of the image based on an altered version of the display information to simulate the perspective of a capturing device or viewing entity at a location different than the capturing device's perspective or the recorded position as defined within the virtual environment. In accordance with various aspects of the systems disclosed herein, the viewer's perception is improved by establishing the viewer's virtual position away from the recorded position. In some embodiments, this is done by selecting a distinct viewer virtual position separate and away from the recorded position. In some embodiments this is done by controlling the amount and rate of change of the viewer's real-world position with respect to the amount and rate of change of the viewer virtual position within the immersive environment.

Employing the separation between the recorded position and the virtual position for the viewer in the immersive environment allows the viewer's relationship to the displayed image to change. For example, if the viewer bends over to look at an object in the immersive environment, that object appears closer. If the viewer moves their body to the left, the displayed environment seems to slide to the right a small amount to account for the viewer's motion. In this way, the immersive environment simulates the way the eye perceives change in the real world. While some differences may be present compared to how changes in the actual environment would have been perceived, the effects are none-the-less sufficient to improve the viewer's experience. In various examples, differences include the visual content being unchanging, meaning changes in the viewer's position do not allow for the addition of any new content, as the viewer is merely viewing pre-captured information (e.g., images or video frames).

The application of the various aspects of the disclosure provided herein minimizes the viewer's feeling of having the viewable world attached to his or her shoulders with the capture device's perspective dictating that environment independent of the viewer's positions or actions (e.g., as the viewer moves around). The application of the various aspects of the disclosure provided herein allows for the coordination of the virtual image display and virtual position changes. The position changes can be selected or based on actual movement that is minimal, natural body motion suitable for viewing content while seated or standing in a limited region. In accordance with various aspects of the disclosure, the immersive display environment provided herein allows the visual experience to become more natural, more like the real world. Additionally or alternatively, feelings of discomfort or nausea when experiencing the display are reduced, especially when relative movements between real-world movement and movement in the immersive environment are simulated and/or scaled relative to one another.

Figure 1B:
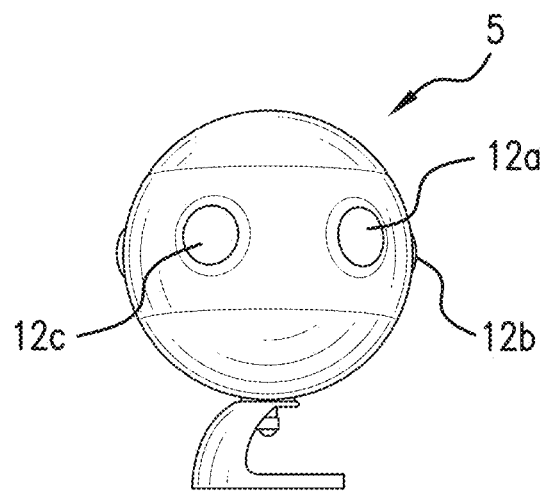
Figure 1C:
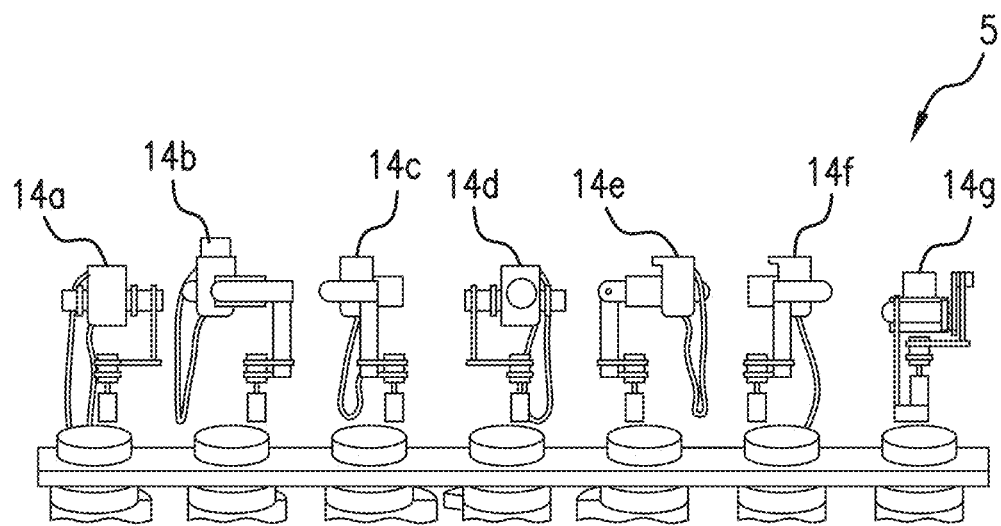

In accordance with various embodiments, the immersive display system is based on suitable environments that provide an immersive feel to the viewer. Establishing the immersive display environment includes capturing real-world information via an image capture device. Image capture devices include any suitable device that can capture an image or plurality of images that can be mapped to a three-dimensional object. FIG. 1A-C illustrates various examples of image capture devices 5. FIG. 1A illustrates an image capture device 5 having a plurality of cameras (e.g., 10a-10c) that point in a plurality of different directions. The plurality of cameras (e.g., 10a-10c) are suitable to capture enough various portions of an image to map the various portions of the image to the inside surface or surfaces of a three-dimensional virtual object. The capture device 5 illustrated in FIG. 1A is suitable to capture spherical photographs, including video. One example of such a device is a GoPro cluster. FIG. 1B illustrates image capture device 5 having a camera with a plurality of lenses (e.g., 12a-12c) that point in a plurality of different directions. The plurality of lenses (e.g., 12a-12c) are suitable to capture enough various portions of an image to map the various portions of the image to the inside surface or surfaces of a three-dimensional virtual object. The capture device 5 illustrated in FIG. 1B is suitable to capture spherical photographs including video. One example of such a device is a purpose-built camera for controlling multiple lenses and processing the photosensitive chipsets for image processing into a spherical image. FIG. 1C illustrates an image capture device 5 having a camera (e.g., 14a-12g) suitable to be positioned in a plurality of different directions. The plurality of directions are suitable to capture enough various portions of an image to map the various portions of the image to the inside surface or surfaces of a three-dimensional virtual object.

Figure 2:
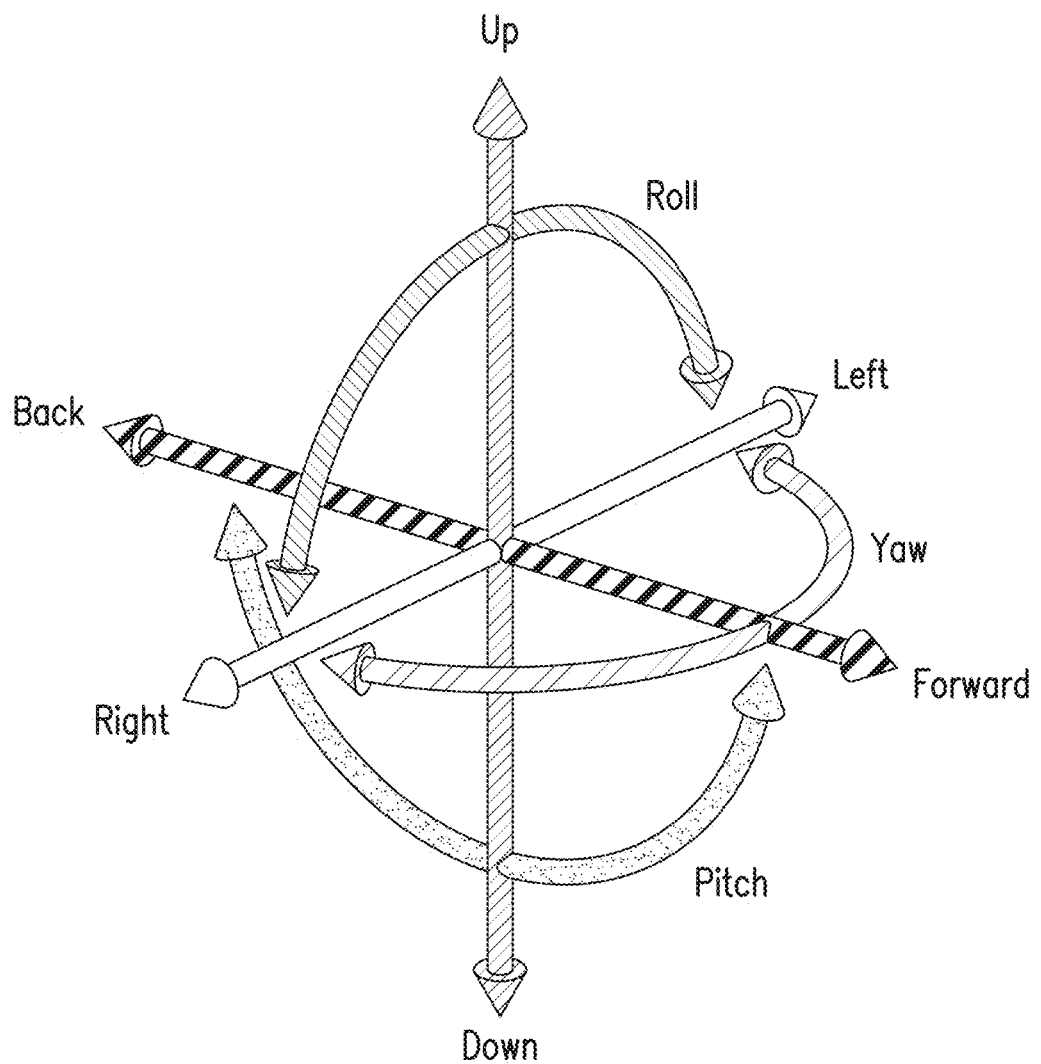
FIG. 2 illustrates an orientation system having six degrees of freedom regarding motion within an immersive display environment.

In accordance with various embodiments, the immersive environment includes an orientation system. For example, as illustrated in FIG. 2, the orientation system includes six degrees of freedom for motion within the immersive display environment. The six degrees of freedom include three translational degrees of freedom (i.e. up, down, forward, back, right, and left) and three rotational degrees of freedom (i.e. roll, yaw, and pitch). In various embodiments, the orientation system corresponds to the real-world orientation such that real-world positions and or movements can be simulated in the immersive display environment.

Figure 3A:
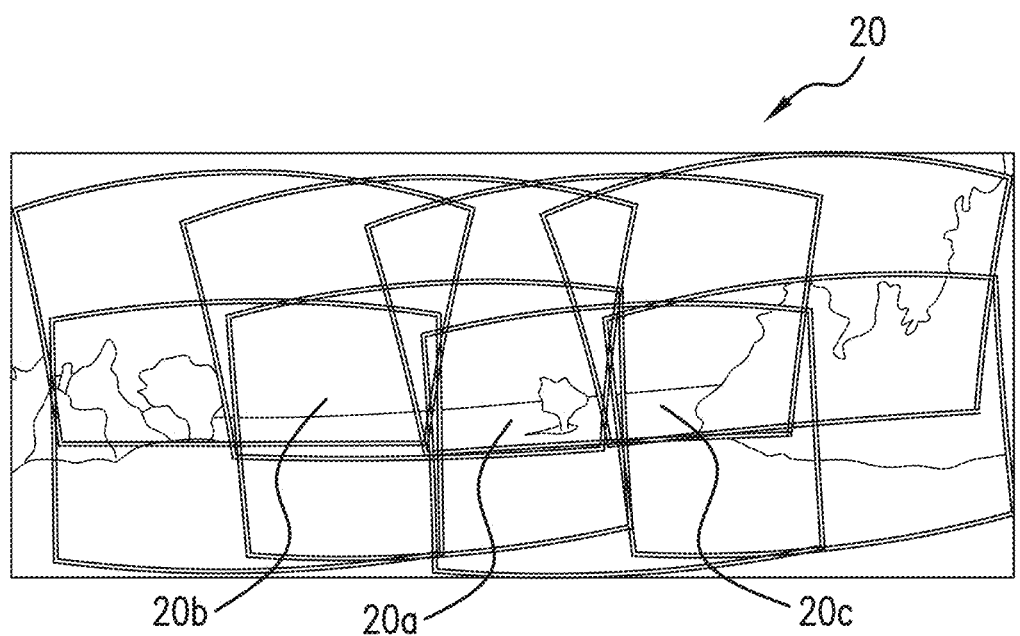
FIG. 3A illustrates an example of a panoramic image converted to a spherical representation.
Figure 3B:
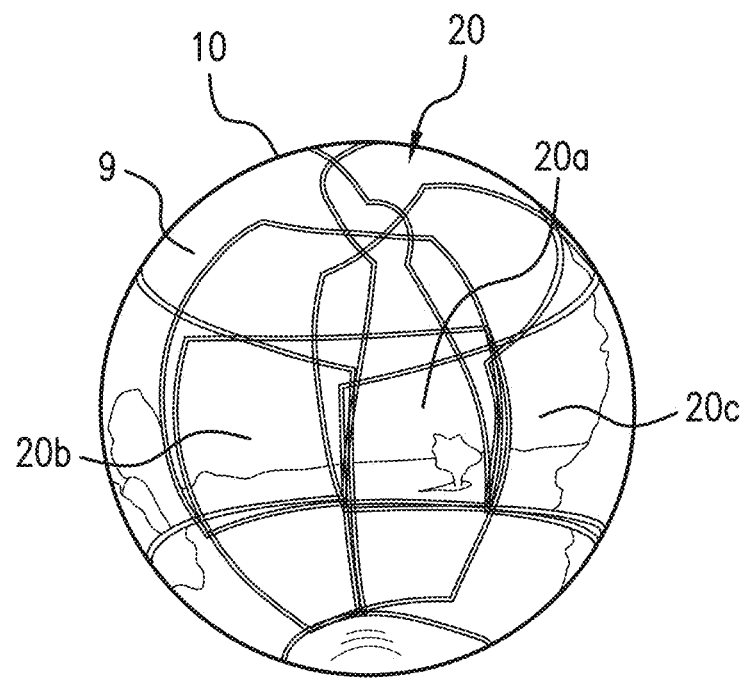
FIG. 3B illustrates an example spherical representation of the panoramic image of FIG. 3A.

In accordance with various embodiments, the image capture device 5 captures one or more images 20 that can be mapped into the interior surface 9 of a virtual object 10. For example, FIG. 3A illustrates an example of the panoramic image that can be converted to a spherical representation as illustrated in FIG. 3B. For example, a plurality of images (e.g., 20a, 20b, and 20c) can be converted from a flat representation to a three-dimensional representation as shown in FIG. 3B. Specifically, the three-dimensional virtual object 10 includes one or more interior surfaces 9 on which the images (e.g., 20a, 20b, and 20c) are mapped.

Figure 4:
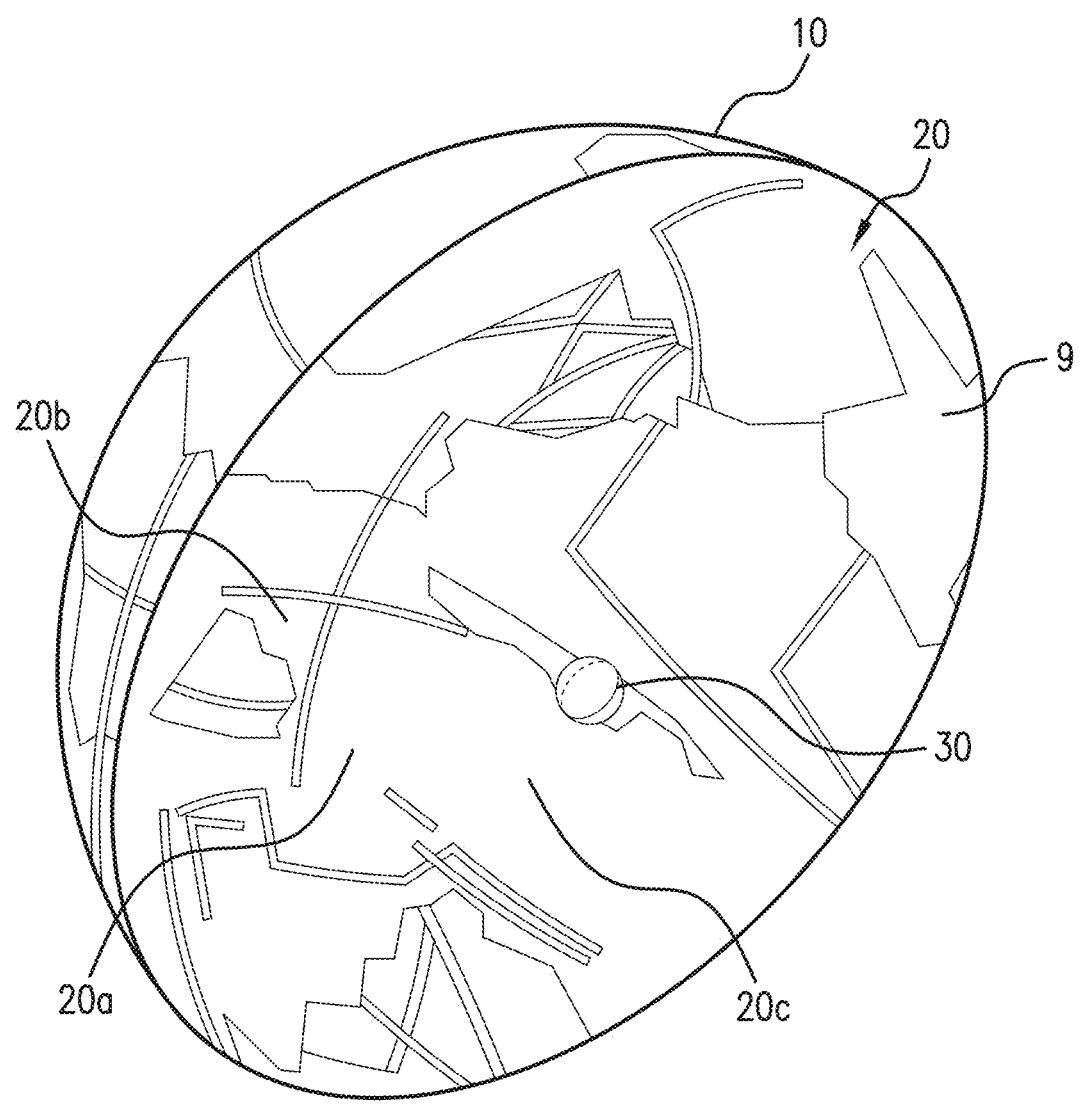
FIG. 4 illustrates an example of a spherically displayed image with a recorded center of the display.

The three-dimensional virtual object 10 can be any suitable virtual object displayable in and defining the immersive environment. In various examples, the object 10 includes a shape having a radius such as partial- or full-cylindrical objects, partial- or full-spherical views, etc. In a particular example, the immersive display environment includes a spherical object 10 with an interior spherical surface 9 on which the image is displayable. As illustrated in FIG. 4, the image 20 is displayed on spherical surface 9 of object 10. FIG. 4 illustrates half a sphere so as to illustrate the interior surface 9 and image content displayed thereon.

In accordance with various embodiments, the object can be defined by other shapes that are likewise suitable for display of the image on an interior surface thereof. For example, the object can be a prism, ellipsoid, cone, or other suitable shape for image display. Preferably, the object 10 shape includes a surface that is able to at least partially wrap around a virtual viewer or recorded position. This wrap around provides and immersive feel to the viewer. In some examples, the interior surface 9 wraps at least 30 degrees around the viewer. In other examples, the interior surface 9 wraps at least 60 degrees around the viewer. In other examples, the interior surface 9 wraps between 60 degrees and 180 degrees around the viewer. In a preferred example, the interior surface 9 wraps about 360 degrees around the viewer.

In accordance with various embodiments and as illustrated in FIG. 4, the image 20 is displayed on the object 10 based on a recorded position 30 or a natural position. The recorded position 30 can simulate or otherwise define the respective position from which the images are captured or a position from which the images appear to be naturally positioned when viewed. In accordance with some embodiments, the recorded position 30 may be defined by a sphere which represents the capture device. This recorded position can have a first radius that is smaller than the object 10 on which the image is mapped. In embodiment, in which object 10 has a radius, its radius is larger than the radius of the recorded position. By increasing the radius of the recorded position relative to the object 10, the image mapped onto object 10 appears larger to the user. By decreasing the radius of the recorded position relative to the object 10, the image mapped onto object 10 appears smaller to the user. The system discussed herein added to this functionality by manipulating the image such that the user can look across the center of the object 10 (i.e. get a bigger field of view that would be given by merely looking out from the recorded position) or rotating relative to a position other than the center of object 10 such that different viewing angles of the image mapped onto object 10 can be seen, other than those views from the recorded position.

Figure 5:
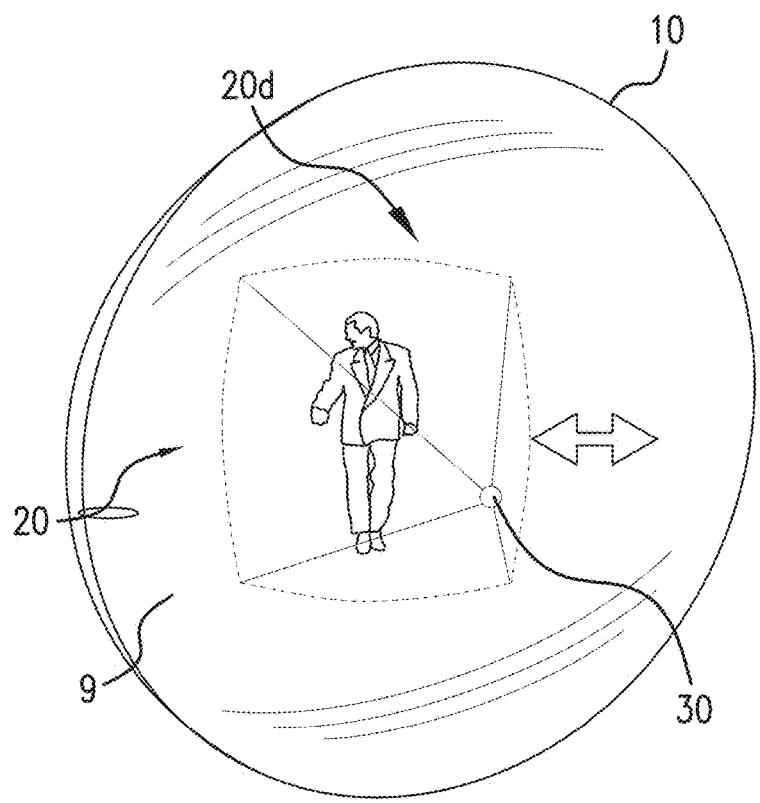
FIG. 5 illustrates an example of an image displayed onto a surface of a spherical display object.

FIG. 5 illustrates an example of an image 20d displayed on a three-dimensional surface on the object 10. As shown, the object 10 is a half sphere with a recorded position 30 at the center thereof and the image 20 displayed on the inside surface 9. In the example shown, the frustum of a sphere is provided as the object 10 on which the image 2d is shown. As used here a frustum is the portion of an object that lies between one or two parallel planes cutting it. A right frustum is a parallel truncation of a right pyramid or right cone. The object for displaying the image can be established without any size dimension. In various embodiments, the object is sized relative to the virtual recording position or capture devise. In various embodiments, the object is sized relative to the radius at which the user can move within a safe zone.

Figure 6A:
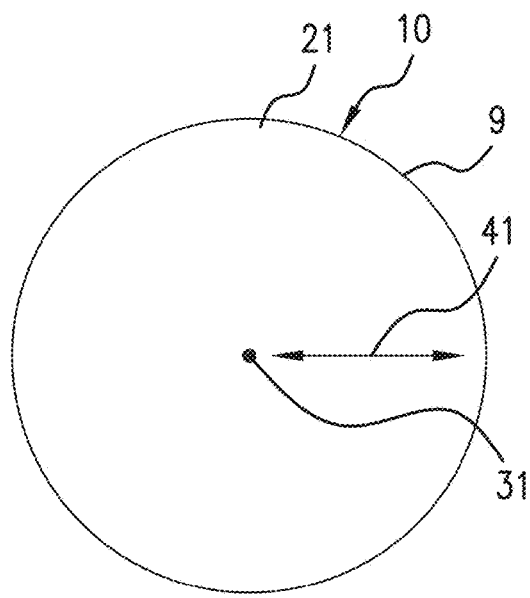
FIG. 6A illustrates an example of a traditional immersive display system that is non-responsive to viewer movement.
Figure 6B:
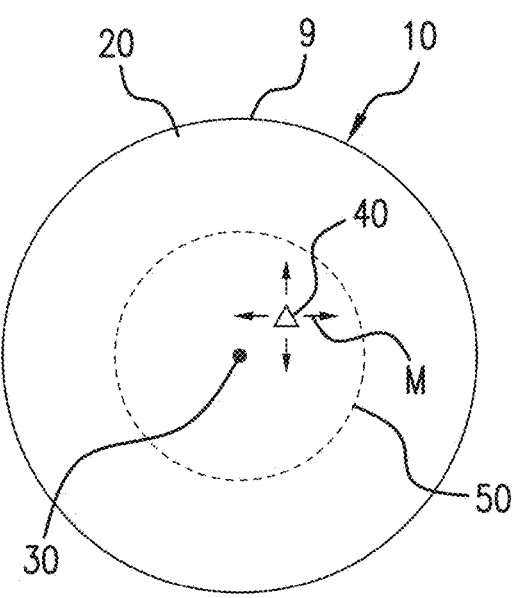
FIG. 6B illustrates an example of an immersive display system that is responsive to viewer movement in contrast to FIG. 6A.

Some display devices lock the virtual position of the viewer 31 to a fixed relationship 41 with the display surface 9 and the photographic-based image 21 thereon as shown in FIG. 6A. In such an arrangement, movement of the viewer provides a direct and equivalent movement of the display surface 9 such that the relationship 41 is always the same. This is an example of a traditional immersive display system that is non-responsive to viewer movement. In contrast, FIG. 6B illustrates an example of an immersive display system that is responsive to viewer movement. In accordance with various embodiments, the viewer virtual position 40 has one or more translational degrees of freedom M. Such translational degrees of freedom M allow the relationship between the viewer virtual position 40 and the recorded position 30 to change. Additionally or alternatively, the relationship between the viewer virtual position 40 and the object or the display surface thereof is likewise able to change. In this way, the viewer is able to view relative changes to the image 20 shown in FIG. 6B, in response to different virtual positions 40.

Figure 7A:
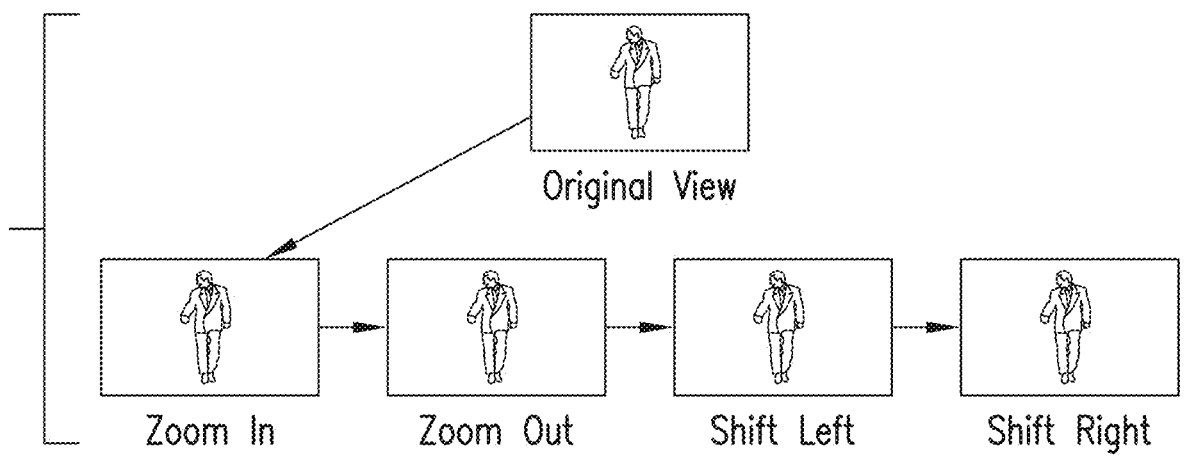
FIG. 7A illustrates an example of a traditional immersive display system that is non-responsive to viewer movement consistent with FIG. 6A.
Figure 7B:
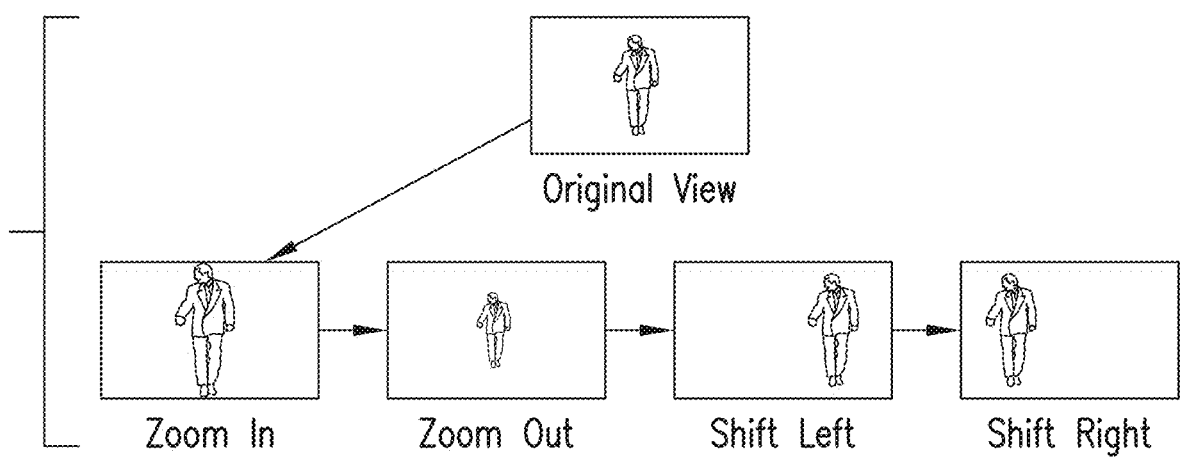
FIG. 7B illustrates an example of an immersive display system that is responsive to viewer movement consistent with FIG. 6B.

FIG. 7A illustrates an example of a traditional immersive display system that is non-responsive to viewer movement consistent with FIG. 6A. As shown in each of the images, the progression based on changes to viewer position results in identical views of the images. The original view is the same as a close view. Additionally or alternatively, the original view is the same as a distant view. Additionally or alternatively, the original view is the same as a viewer left shift. Additionally or alternatively, the original view is the same as a viewer right shift. In contrast, FIG. 7B illustrates an example of an immersive display system that is responsive to viewer movement consistent with FIG. 6B. As shown in each of the images, the progression based on changes to viewer position relative to the recorded position 30 results in different displayed images. For example, the original view is smaller than the close view, which, as shown, is a zoomed-in version of the original view simulating movement toward the image. Additionally or alternatively, the original view is smaller than the distant view, which, as shown, is a zoomed-out version of the original view simulating movement away from the image. Additionally or alternatively, the original view is centered compared to a right-biased view of the viewer, which, as shown, simulates a left-shifted position of the viewer. Additionally or alternatively, the original view is centered compared to a left-biased view of the viewer, which, as shown, simulates a right-shifted position of the viewer.

Figure 8:
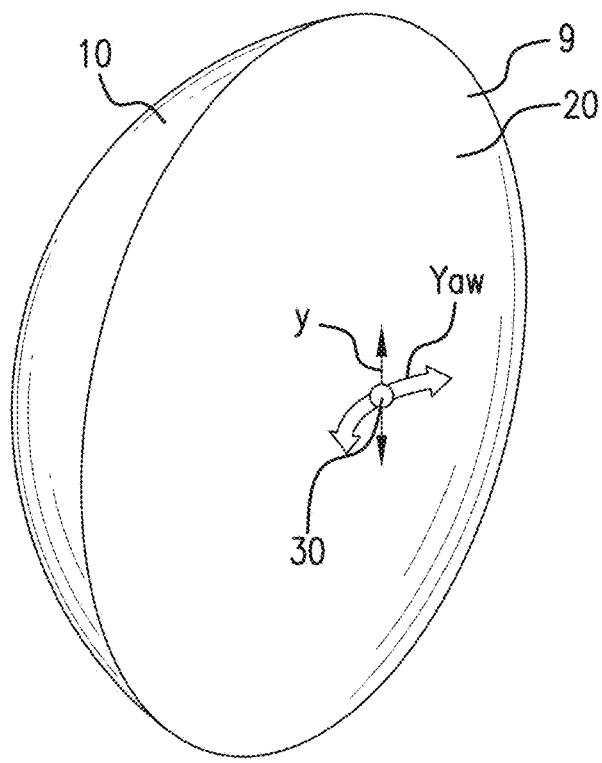
FIG. 8 illustrates an example of a spherical display range with respect to yaw or rotational motion of the viewer about the Y-axis.
Figure 9:
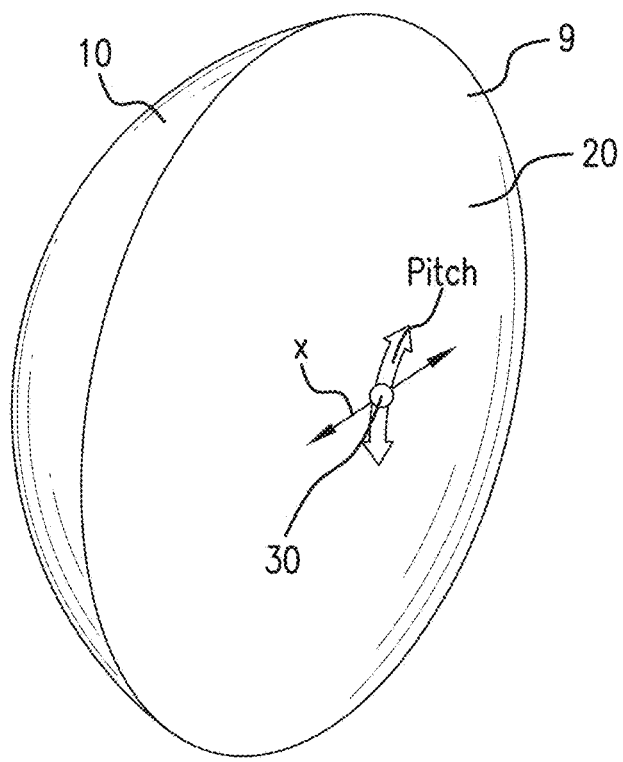
FIG. 9 illustrates an example of a spherical display range with respect to pitch or rotational motion of the viewer about the X-axis.
Figure 10:
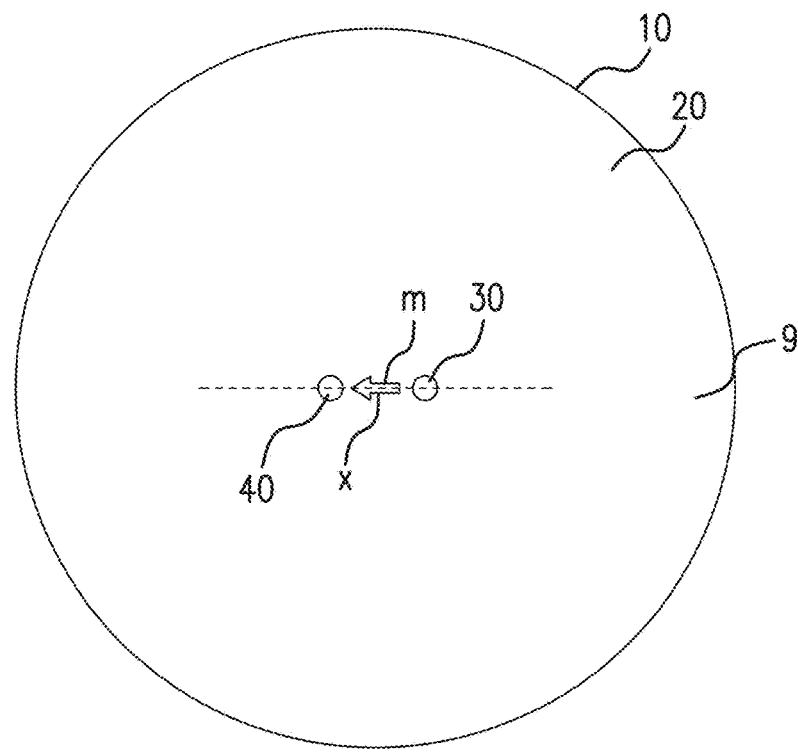
FIG. 10 illustrates an example of a spherical display with respect to lateral or X-axis motion of the viewer.
Figure 11:
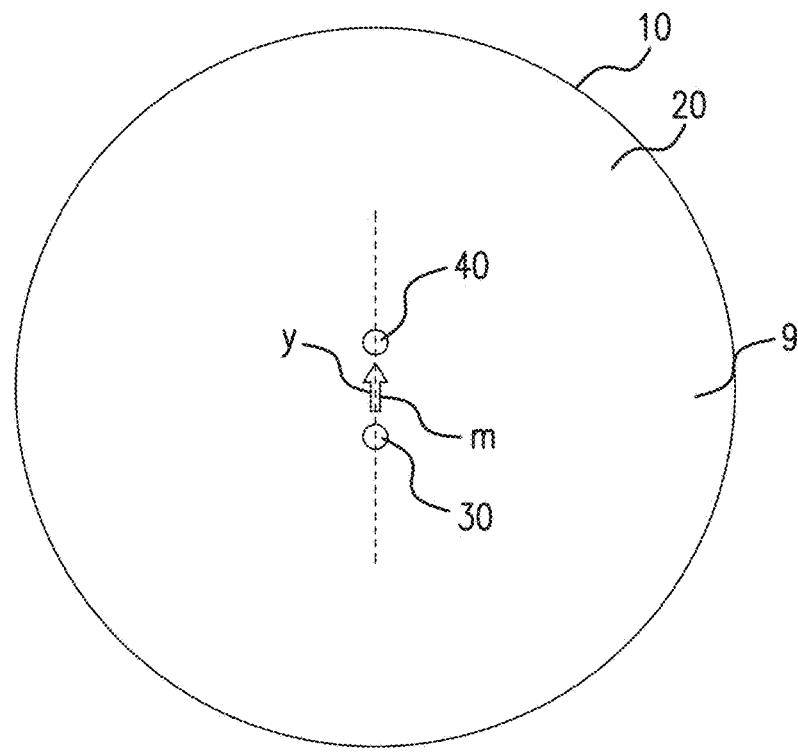
FIG. 11 illustrates an example of a spherical display with respect to vertical or Y-axis motion of the viewer.
Figure 12:
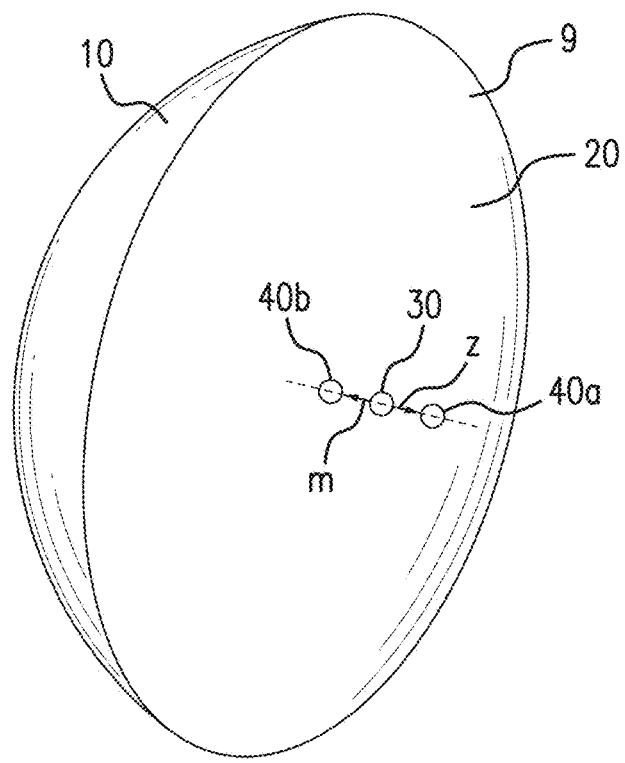
FIG. 12 illustrates an example of a spherical display with respect to in-and-out or Z-axis motion of the viewer.
Figure 13:
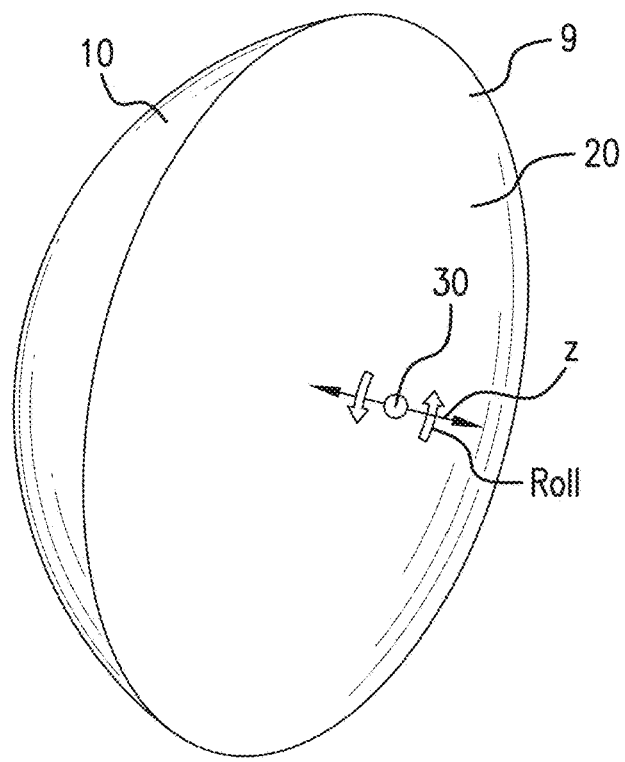
FIG. 13 illustrates an example of a spherical display with respect to roll or rotational motion of the viewer about the Z-axis.

FIGS. 8-13 illustrate various examples of a spherical display image 20 with a respective recorded position 30 relative to a shifted viewer virtual position based on the image 20 displayed on the interior display surface 9 of a spherical object 10 (shown as a half sphere). FIG. 8 illustrates an example of a spherical display range with respect to yaw or rotational motion of the viewer about the Y-axis. FIG. 9 illustrates an example of a spherical display range with respect to pitch or rotational motion of the viewer about the X-axis. FIG. 10 illustrates an example of a spherical display with respect to side-to-side or X-axis motion of the viewer showing a recorded position 40 and a viewer virtual position 30 with displacement M in the transverse direction. FIG. 11 illustrates an example of a spherical display with respect to vertical or Y-axis motion of the viewer showing a recorded position 40 and a viewer virtual position 30 with displacement M in the vertical direction. FIG. 12 illustrates an example of a spherical display with respect to a lateral or Z-axis motion of the viewer, showing a recorded position 40 and a viewer virtual position 30 with displacement M in the lateral direction. FIG. 13 illustrates an example of a spherical display with respect to roll or rotational motion of the viewer about the Z-axis.

Figure 14A:
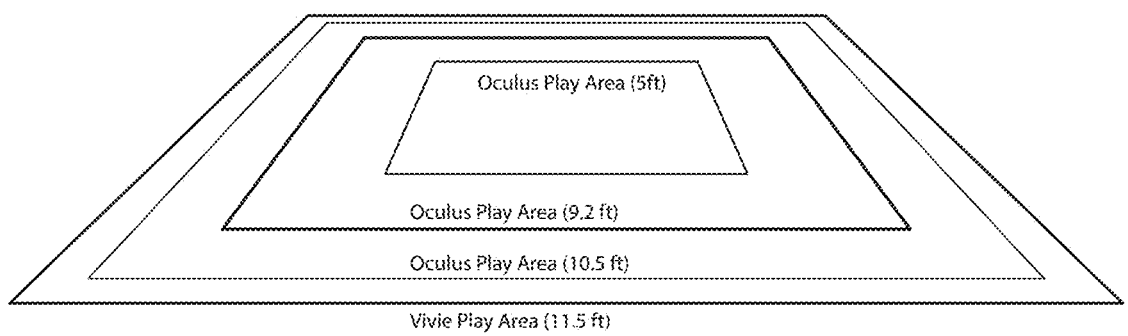
FIG. 14A illustrates a plurality of example constrained viewer areas based on a plurality of head-mounted display units.
Figure 14B:
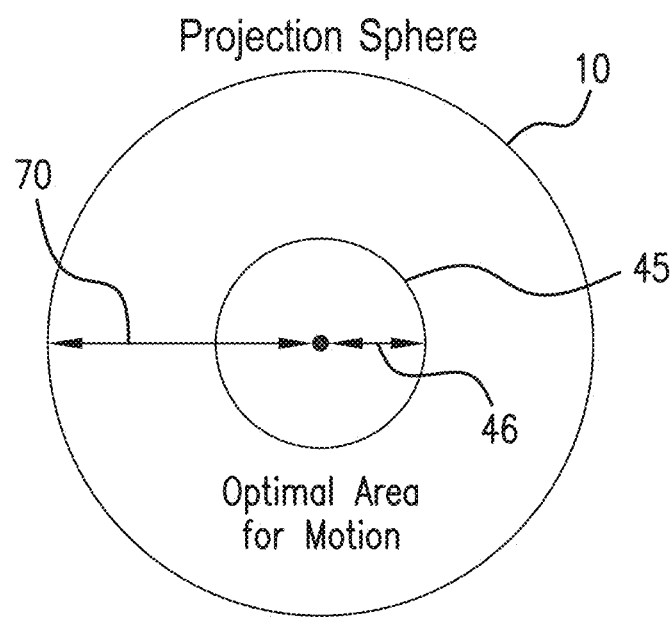
FIG. 14B illustrates an example schematic of a constrained viewer area in accordance with various embodiments of the disclosure herein.

In various embodiments, the translational degree of freedom is limited to constrained zone 45. The photographic information mapped onto the object defines the total movable region a viewer can traverse while maintaining a perspective that can view the photographic information. However, in the immersive environment, if the viewer moves too close to the object surface, the photographic image displayed thereon can be unclear due to the dramatically shifted perspective. Moving beyond the surface would entirely obscure the view of the information. As such, the system 100 can include a constrained zone 45. The zone 45 may be sized to represent a natural area from which a viewer could view the image without significant distortion of the image 20. In various examples, the safe zone is between ¼ and ¾ of the reference dimension. In one example, the safe zone is about ½ of the reference dimension. For example, FIGS. 14A-B illustrate a plurality of constrained zones based on a plurality of head-mounted display units. FIG. 14B illustrates an example schematic of a constrained zone 45 in accordance with various embodiments of the disclosure herein.

Figure 15:
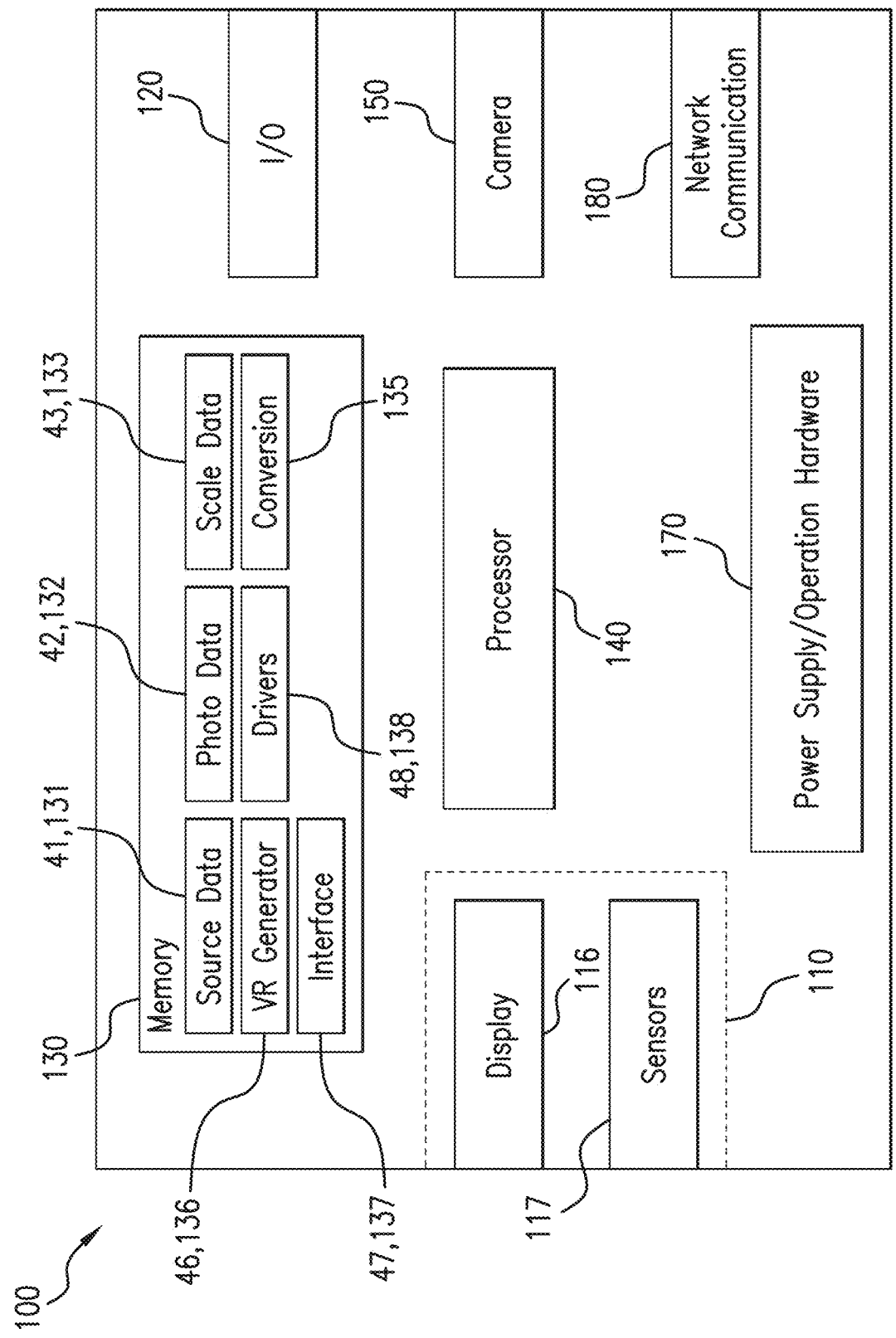
FIG. 15 illustrates a schematic diagram of an immersion display system for implementing the immersion environment according to various embodiments herein.

As is variously provided, the immersive display system 100, as illustrated in FIG. 15, for example, includes various systems and methods for creating a viewer virtual adjustable perspective display. In various embodiments, the viewer virtual adjustable perspective display adjusts the display of a photographic image 20 relative to various viewer virtual positions. In accordance with various embodiments, the system provided herein provides an image to each of the user's eyes based on portions of the display image 20.

In various embodiments, referring to FIG. 15, the immersive display system 100 includes a viewing device 110 suitable for displaying the image 20 information in the immersive environment 50. The viewing device 110 can include one or more devices suitable to present the immersive environment to the viewer. The viewing device 110 can include simulated reality or virtual reality head-mounted displays (HMD). Examples of such HMDs include mobile devices (e.g., Oculus Go, Pico, Vive Focus, etc.), immersive VR (e.g., Oculus Rift, HTC Vive, HTC Vive Pro, Windows Mixed Reality, etc.), augmented reality devices (e.g., HoloLens, Magic Leap, etc.) phones (e.g., phone with Gear VR, phone with cardboard all via app or Web VR, etc.) tablets (e.g., tablet with app or web VR) Laptop/Desktop (e.g., laptop/desktop with app or web VR), projection mapping, cave display, or other suitable systems. In accordance with various embodiments, the HMD may include a viewer position tracking device suitable to record viewer movement such that the display system 100 can acquire that information and utilize it to simulate movement or repositioning of the viewer in the immersive environment.

Figure 16:
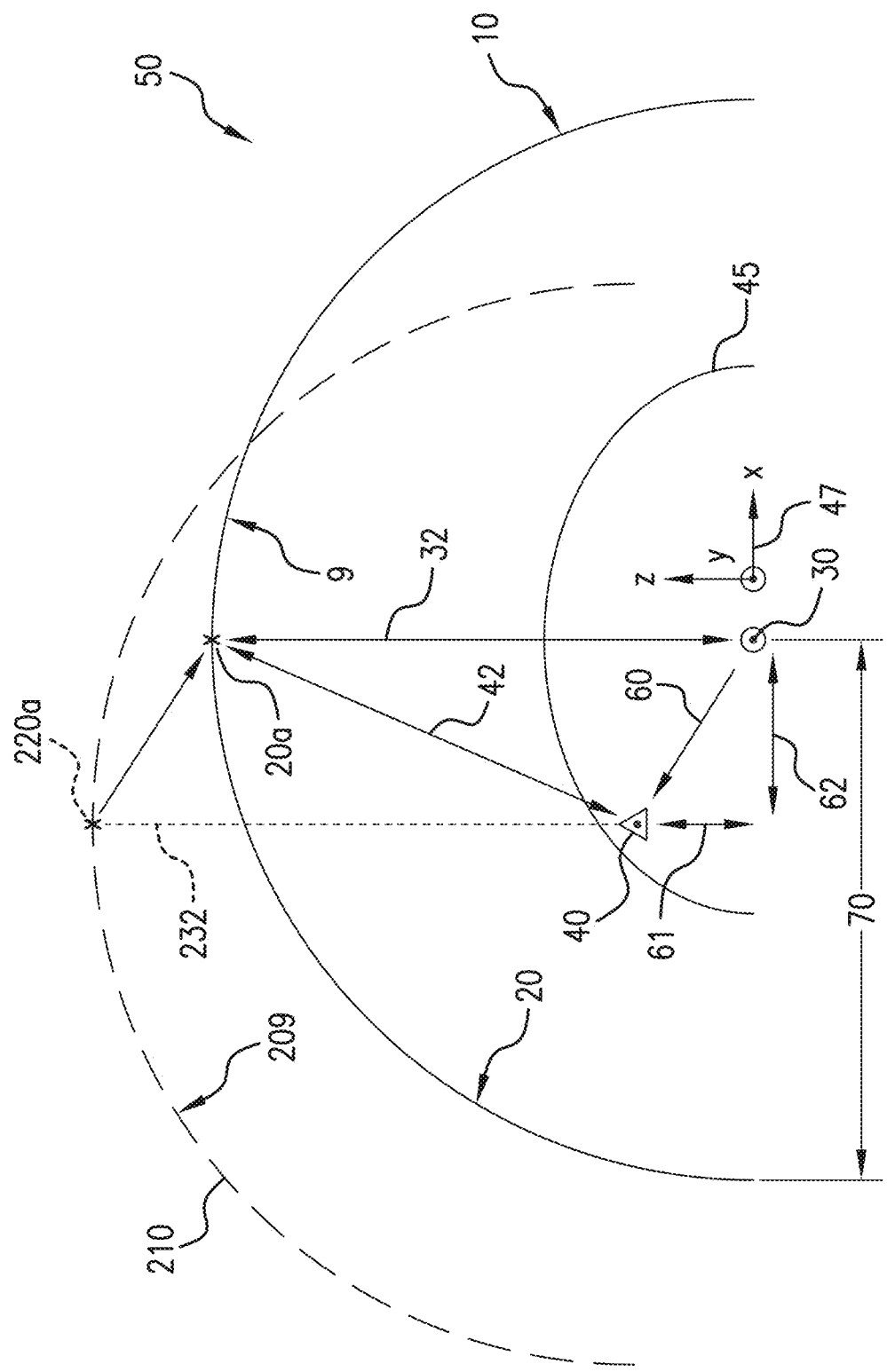
FIG. 16 illustrates a schematic diagram of an immersive environment based on photographic information according to various embodiments herein.

FIG. 16 illustrates an example schematic representation of the immersive environment 50 and relations provided therein. In one embodiment, referring to FIG. 16, the immersive environment 50 is defined in part by an object 10. As shown by way of example in FIG. 16, the object 10 is a hemisphere as shown as a schematic section. The object 10 includes an interior display surface 9 suitable to map the image 20 onto, as discussed in the various embodiments and examples above. The object 10 also includes a reference dimension 70.

The object 10 also includes a reference dimension 70, in accordance with various embodiments, that can be any suitable dimension of the object or otherwise attributed to the object 10.

The immersive environment 50 includes recorded position 30 and a viewer virtual position 40. While in some instances the recorded position 30 and a viewer virtual position 40 can be the same position, it should be noted that position 30 and position 40 are also separable from one another such that both exist with a scaled position change 60 extending therebetween.

The viewer virtual position 40 can be defined by a scaler function of the reference dimension 70. In some embodiments, this scaler function can be further broken down into scaler functions of translation along different axes. In some embodiments, each degree of translational freedom may have its own scaler function. As can be seen in FIG. 16, the viewer virtual position enjoys at least x and z degrees of translational freedom with positional components 61 and 62. Each of these components can be based on a scale of the same reference dimension 70 or they can be based on different reference dimensions (e.g., in situations where the object is a cube, the x and z components can be scaled from x and z preferred dimensions of the cube.) Since the example shown in FIG. 16 has a single radius, in this embodiment, components x and z are scaled from the same reference dimension 70. However, these components can in some embodiments have the same scale or in other embodiments have different scales of the same reference dimension 70. In some embodiments the scales can be variable allowing for continuous virtual movement of the viewer virtual position 40. The effective change in a two-degree-of-freedom system would result in an image shift in response to a position change that combines multiple frames shown in FIG. 7B. For example, an image at reference point 20a would appear to increase in size and shift to the right based on a position change from the recorded position 30 to the viewer virtual position 40. All other viewer virtual positions would have corresponding image shifts based on their relative position to the recorded position 30.

The scaled position change 60 illustrated in FIG. 16 also reflects the amount of change of the image 20 that a viewer might see in the viewing device as compared to a viewing device that does not respond to modifying the photographic information due to viewer position changes. The object 210 reflects the relationship of the virtual viewer 40, if the display 209 was not responsive to the positional change of the virtual viewer 40. In this situation, the display reference point 220a shifts with the viewer by the amount of the scale or the related scaled movement such that the reference point 220a tracks with and ends up in the same relative location to the viewer. Alternatively, in another frame of reference, display reference point 20a shifts away from the virtual viewer position 40 in an amount designated by the scale or related scaled movement such that display reference point 20a is a modified position giving the viewer the simulated view of a change in position. This simulated view is not accommodated by reference point 220a.

The movement and/or scaled relationship of the movement of the viewer is input into the system 100 by one or more sensors or input devices discussed in more detail below. In this way, the viewer or an external user can manipulate the scale or position of the viewer via the sensors (e.g., motion tracking sensors on a VR headset) or input device (e.g. graphical user interface (GUI) provided through the VR headset or external thereto). In one example, sensors mounted to the HMD monitor user location and provide input into the system 100 regarding the user location. In one example, a GUI (either internal to the immersive environment or external on a separate device) is provided that has input objects (e.g. a slide bar) that can be used to adjust the scale and thereby the users overall experience.

The scaled movement of a user can account of a wide range of resultant virtual movement. For example, in some situations a viewer may be limited to minor head movement (e.g., 1-20 centimeters) this minor movement may translate via the scaled translation to meters of perceived movement in the virtual world or similarly minor movement of a few centimeters or any range in-between. In some examples, a viewer may be able to move on a scale of multiple meters in real world movement. This movement can be scaled upward to a sensation of many kilometers in the immersive environment or down to centimeters in the immersive environment. In some embedment's, the scale may be used to only slightly modify the change from real world to virtual movement to account for the viewer preference. The input device used to adjust the scale can be readily accessible to the viewer so that the viewer can make the adjustments in real time while experiencing the immersive environment and therefore adjust the scale to improve the comfort of the immersive environment.

Figure 17:
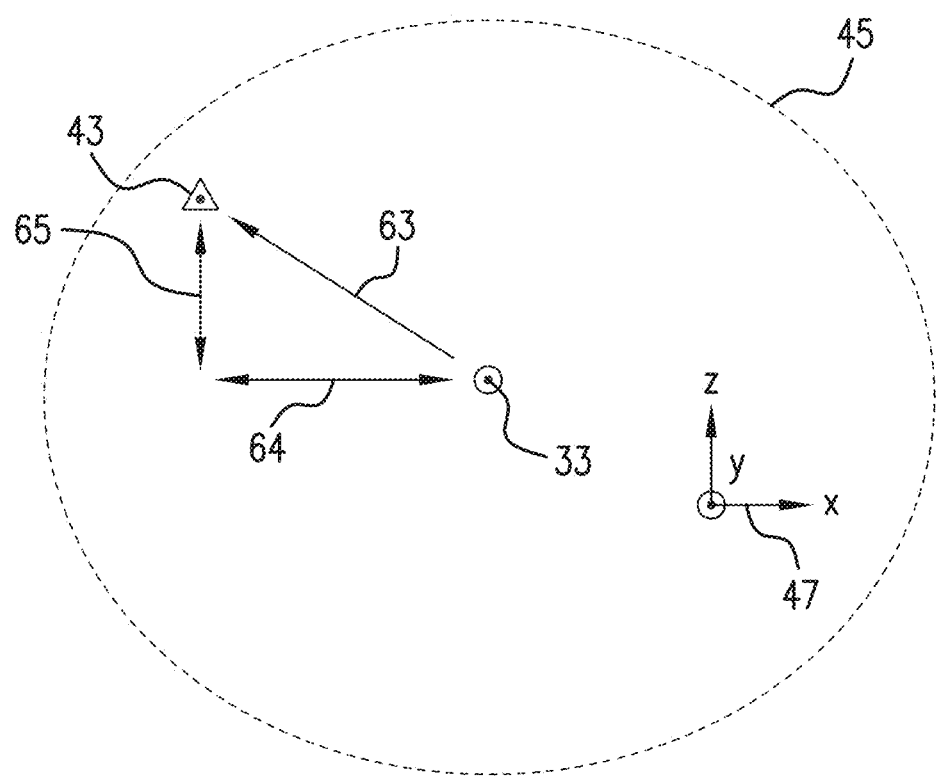
FIG. 17 illustrates a schematic diagram of real-world movement of a viewer corresponding to the immersive environment of FIG. 16 according to various embodiments herein.

FIG. 17 illustrates a viewer's movement that would result in the viewer virtual position 40 of claim FIG. 16. As shown, the viewer traverses distance 63 from starting position 33 to end position 43. This distance is scaled to establish scaled position change 60 shown in FIG. 16. Distance 63 can also be based on component distances 64 and 65. These component distances 64 and 65 can scale to scaled position changes 61 and 62 shown in FIG. 16. Both real-world and virtual movement within the immersive environment can be based on consistent coordinate systems 47 with multiple degrees of freedom.

In accordance with various embodiments, the scale can be applied to a real-world movement and direction of the viewer as acquired through an input device such as movement sensors on an HMD. In this way, the real-world movement can be scaled such that a fraction or a multiple of the real-world movement forms the amount of the virtual world movement in the various directions having translational degrees of freedom.

While transitional changes in position are contemplated herein with resultant changes to the display, rotational degrees of freedom (roll, pitch, and yaw) are also contemplated herein. In embodiments in which recorded position 30 might be a center position if the object 10 is a sphere, the object 10 and the display surface are all at a constant perceived distance regardless of utilization of the direction of viewing (utilizing roll, pitch, and yaw). However, the perceived distances would be substantially different for the various viewing direction when utilizing roll, pitch, or yaw from the viewer virtual position 40. For example, the positive x direction would be substantially larger than the negative x direction. Thus, items in the negative x direction may be shown as larger than the positive x direction due to a closer proximity to the object's 10 display surface 9. Thus, there is a clear sensation to the viewer of a new position in the immersive environment despite the use photographic image information.

In various embodiments, referring to FIG. 15, the immersive display system 100 includes one or more storage devices 130. In various embodiments, the storage device 130 may include a non-transitory memory containing computer-readable instructions operable to display and adjust the display of information in an immersive environment.

FIG. 15 illustrates an example of a schematic diagram of an immersion display system 100 for implementing the immersion environment. The immersion display system 100 can support and implement a portion of the systems illustrated in the other figures shown and discussed herein or can support and implement all of the systems illustrated in the other figures shown and discussed herein. For example, immersion display system 100 may be a part of a single device or may be segregated into multiple devices that are networked or standalone. The immersion display system 100 need not include all of the components shown in FIG. 15 and described below. In various embodiments, the immersion display system 100 can include an interface, display, camera, or sensors. In various examples, the immersion display system 100 can exclude one or more of an interface, display, camera, or sensors.

In accordance with various embodiments, as illustrated in FIG. 15, the immersion display system 100 includes one or more processing elements 140, an input/output connection 120, one or more memory components 130, a camera 150, a virtual reality device 110, a power source 170, a networking/communication interface 180 and/or other suitable equipment for implementation of an immersion environment, with each component variously in communication with each other via one or more system buses or via wireless transmission means. Each of the components will be discussed in turn below. The memory components 130 include one or more of environment data 131, photographic data 132, scale data 133, conversion module 135, virtual reality generator 136, interface 137, and drivers 138.

As indicated above, the immersion display system 100 includes one or more processing elements 140. The processor 140 refers to one or more devices within the computing device that is configurable to perform computations via machine-readable instructions stored within the memory components 130 of the three-dimensional the immersion display system 100. The processor 140 can include one or more microprocessors (CPUs), one or more graphics processing units (GPUs), and one or more digital signal processors (DSPs). In addition, the processor 140 can include any of a variety of application-specific circuitry developed to accelerate the immersion display system 100. The one or more processing elements may be substantially any electronic device capable of processing, receiving, and/or transmitting instructions. For example, the processing element 140 may be a microprocessor or a microcomputer. Additionally, it should be noted that the processing element may include more than one processing member. For example, a first processing element may control a first set of components of the computing device and a second processing element may control a second set of components of the computing device, where the first and second processing elements may or may not be in communication with each other, e.g., a graphics processor and a central processing unit which may be used to execute instructions in parallel and/or sequentially.

In accordance with various embodiments, one or more memory components 130 are configured to store software suitable to operate the immersion display system 100. Specifically, the software stored in the memory launches immersive environments via an immersion environment generator 136 within the immersion display system 100. The immersion environment generator 136 is configured to render immersion environments suitable to be communicated to a display. In order to render the immersion environment, the immersion environment generator 136 pulls the source data 131 and photographic data 132 from memory and instantiates them in a suitably related environment provided by the generator 136. In various embodiments, conversion engine 135 maps the photographic data 132 to an object stored in, for example, the source data 131. The conversion engine 135 can also scale the object information into scale data 133. The scale data can be utilized to display and manipulate the object to adapt the immersive environment to a comfortable display for the viewer. The photographic data 132 can locally be stored in a database, file, or suitable format or it can be stored remotely.

Each of the source photographic data 132, the scale data 133, and the conversion functions within the conversion engine 135 can be dynamically updated via the interface 137. In various embodiments, the processor 140 can access the immersive environment generator 136 and interface memory 137 and instantiate a viewer interface within or external to the environment, allowing a viewer access to review or modify the source photographic data 132, the scale data 133, and the conversion functions within the conversion engine 135.

The generator 136 is configured to provide instructions to the processor 140 in order to display images in the proper format such that the image is presented on the object and the object in the proper orientation to the viewer to improve the viewer experience. In various embodiments, the object from source data is a sphere with the interior thereof displayed within the display 116. The photographic information is mapped onto the interior surface of the sphere. In various embodiments, the location of the object and the photographic information is repositioned relative to the view location and displayed on the display 117 accordingly.

In accordance with various embodiments, the computing system 100 includes one or more network communication connections 180. The network communication connections 180 are configured to communicate with other remote systems. The networking/communication interface receives and transmits data to and from the computing device. The networking/communication interface may transmit and send data to the network, other computing devices, or the like. For example, the networking/communication interface may transmit data to and from other computing devices through the network which may be a wireless network (e.g., Wi-Fi, Bluetooth, cellular network, etc.) or a wired network (Ethernet), or a combination thereof. In particular, the network may be substantially any type of communication pathway between two or more computing devices. For example, the network may be wireless, wired, or a combination thereof. Some examples of the network include cellular data, Wi-Fi, Ethernet, Internet, Bluetooth, closed-loop network, and so on. The type of network may include combinations of networking types and may be varied as desired. In some embodiments, the network communications may be used to access various aspects of the immersive platform from the cloud, another device, or dedicated server.

In various embodiments, the network communication connections 80 may also receive communications from one or more of the other systems including the input/output connection 120, the memory components 130, the camera 150 and/or sensors 117, and/or the display 116. In a number of embodiments, the computing system 100 uses a driver memory to operate the various peripheral devices including the display 116, the I/O 120, the sensors 117, camera 150, and/or the operation hardware/power supply 170, and/or the network communications 180.

In accordance with various embodiments, the system provides the viewer ability to load data from existing tools into the immersive environment. For example, an input interface 120 allows the computing device to receive inputs from a viewer and in some examples, provide output to the viewer. The input 120 interface may include suitable virtual reality, augmented reality, or mixed reality controllers. For example, the controllers can include hand tracking devices, haptic gloves, body suites, neurological input devices (e.g. brain wave sensors) or other suitable custom devices that provide an input interface with the immersive environment. In specific examples, the controllers can include Oculus touch controllers, HTC Vive controllers, or Leap Motion hand tracking controllers. In some embodiments, traditional controllers such as keyboard, mouse, camera, stylus, or the like can be used for interface with the system. The type of devices that interact via the input/output interface may be varied as desired. Additionally, the input/output interface may be varied based on the type of computing device used. Other computing devices may include similar sensors and other input/output devices.

The memory stores electronic data that may be utilized by the computing device. For example, the memory may store electrical data or content, for example audio files, video files, document files, and so on, corresponding to various applications. The memory may be, for example, non-volatile storage, a magnetic storage medium, optical storage medium, magneto-optical storage medium, read only memory, random access memory, erasable programmable memory, flash memory, or a combination of one or more types of memory components.

The display system 110 may be separate from or integrated with the system 100. For example, the display system 110 may be a part of an HMD. The system 110 can include a display portion 116. In some embodiments, the system 110 can also include a sensor 117. The system 110 can be integrated with the computing device or separate therefrom. The display 116 provides a visual output for the system 100.

In accordance with various embodiments, the viewer can move around the immersive environment in any direction desired to be enabled as discussed above. In accordance with various embodiments, the object in the immersive environment moves relative to the viewer. The generator 136 may receive information from the I/O 120, sensors 117, camera 150, the network communication 180, and/or the memory 130 so as to render the environment continuously from different perspectives as the viewer provides input through the I/O 120 or sensors 117, or the network communication 180 to change the viewer's relative location in the environment or object.

In accordance with various embodiments, the generator 136 dynamically changes the environment in response to viewer input or the conversion engine 135. As discussed above, the generator can dynamically render new perspectives for the viewer by shifting the display surface (e.g., interior surface of the object) relative to the viewer. This source of dynamic updating of viewer input, conversion engine 135 algorithms, sensors 117, and/or source data 131 allow for system to display a broad comparison of adjustable displays.

Figure 18:
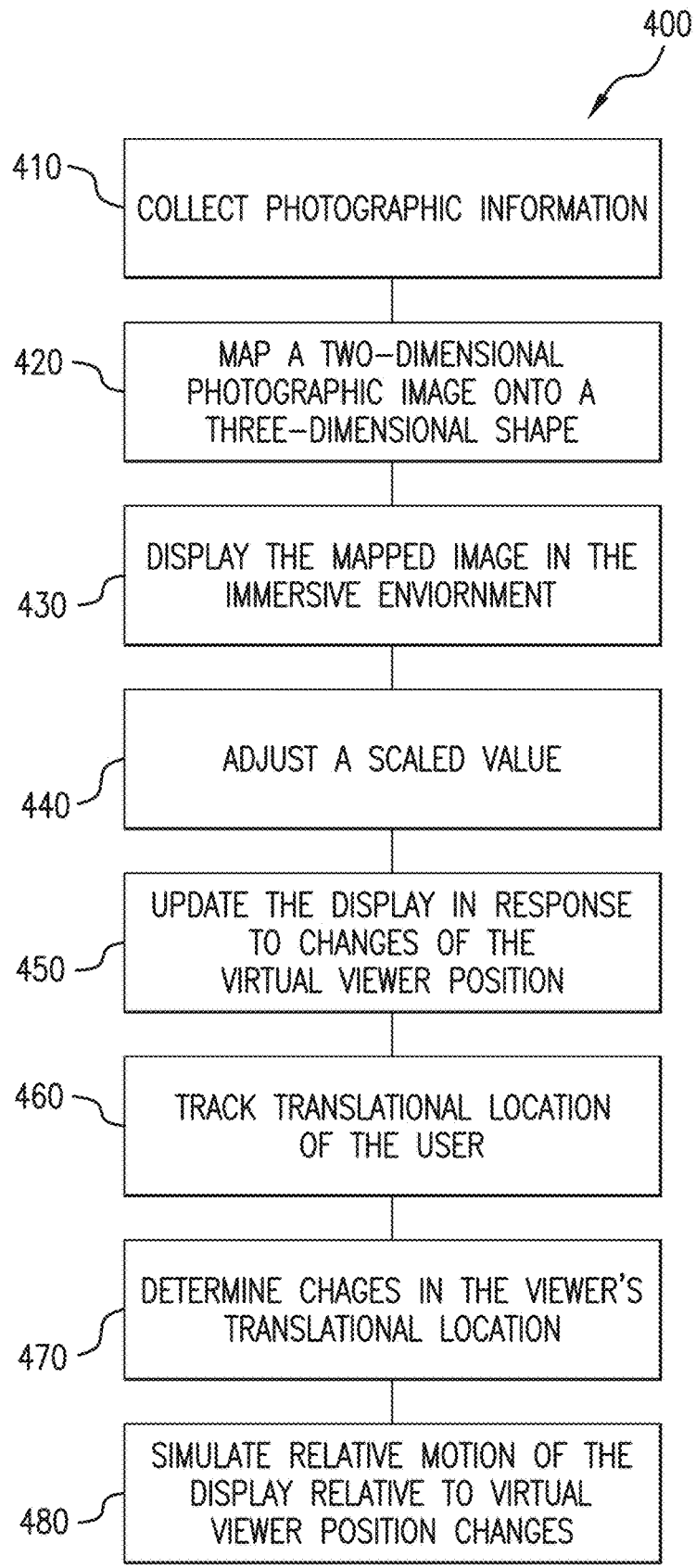
FIG. 18 illustrates an example flow diagram for the process for implementing an immersion environment based on photographic information according to various embodiments herein.

FIG. 18 illustrates an example flow diagram for the process 400 for implementing an immersion environment based on photographic information according to various embodiments herein. In accordance with various embodiments, the process 400 includes collecting photographic information (410). In accordance with various embodiments, the photographic information is acquired from a source that is displayable as two-dimensional display information, e.g., in a flat still image, a video recording, or the like. The photographic information is preferably based on real-world information and recorded accordingly. While in some embodiments, the photographic information may contain three-dimensional perspective attributes (e.g., three-dimensional photograph) such information may still be typically displayed in a flat (two-dimensional) format.

In accordance with various embodiments, the process 400 includes mapping the photographic image onto a three-dimensional shape (420). In accordance with various examples, the two-dimensional image is mapped symmetrically about a virtual recorded location. In some examples, the two-dimensional image is mapped such that the virtual recorded location corresponds to the recorded position in the immersive environment. The three-dimension shape is a virtual reality object produced within the virtual reality system/generator. The embodiments of these objects include those discussed above. For example, the object can be a sphere with the two-dimensional image mapped onto the internal surface of the sphere allowing for display in an immersive environment on the viewing device.

The process 400 includes displaying the mapped image in the immersive environment at a virtual displayed orientation (430). The virtual display orientation corresponding to the virtual viewer position. The virtual display orientation is different than a display orientation corresponding to the recorded position. The differences in the virtual and recorded display orientation provides a simulation of a change in position relative to the immersive environment for the viewer.

In accordance with various embodiments, the process 400 includes setting a scaled value based on the reference dimension of the object (440). Adjusting the scaled value changes the relationship between the input movement and virtual movement. As discussed above, the input can be based on viewer controls or in other examples, the input movement can be based on real-world movement of the viewer as sensed and processed via an HMD.

In some embodiments, changing the scale can change the display giving the simulation of a changed viewer position. This is because, a first scaled value creates a first virtual viewer position relative to the recorded position based on a first input movement. This results a in a first virtual display position. A second scaled value creates a second virtual viewer position relative to the recorded center based on the same first input movement. This second scaled value results in a second virtual display position simulating the different change in position between the recorded center and the second virtual viewer position. Thus, in some embodiments, the change in scale can result in a simulation of movement, at least when the input is indicative that the view is not at the recorded position.

In some embodiments, the process 400 includes updating the virtual display in response to changes of the virtual viewer position (450). In response to changes to the scaled value and/or position input changes, the virtual display is updated to provide a simulation of environmental movement. This resultant immersive environmental change can reduce the discomfort of the viewer based on the viewer's positional input changes. Thus, when the position input change is based on a viewer's real-world motion, the environment change limits the viewer discomfort.

In some embodiments, the process 400 includes tracking at least one actual translational location of the viewer (460) along at least one translational degree of freedom of the viewer. As discussed above, this may be done via sensors, on the HMD or via another input device. In some embodiments, the process 400 includes determining changes in the viewer's translational location (470). These changes can be scaled as discussed above to indicate the virtual viewer position. The process 400 includes simulating motion by updating the virtual display position relative to the viewer virtual position based on the scale in response to continued position changes (480).

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular examples only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical viewer interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An immersive display system with adjustable perspective, comprising:
    a viewing device suitable for displaying display information in an immersive environment relative to a recorded position that is separable from a user-based virtual viewer position;
    an input device configured to adjust a relationship between the virtual viewer position and the recorded position;
    a non-transitory memory containing computer-readable instructions operable to display and adjust the display information in the immersive environment;
    an image storage element that stores at least one two-dimensional photographic image; and
    a processor configured to process the instructions for carrying out the following steps for creating a displayed immersive environment:
        map the at least one two-dimensional photographic image onto a surface of a three-dimensional shape wrapped around a virtual recorded position that corresponds to the recorded position, the three-dimensional shape having a reference dimension, and
        display the mapped image in the immersive environment wrapped around the virtual recorded position and extending around the virtual viewer position sufficiently to provide the displayed immersive environment, the mapped image being displayed at a virtual display orientation corresponding to the virtual viewer position and displayed extending around the virtual viewer position to provide the displayed immersive environment,
        wherein the virtual viewer position is spaced from the virtual recorded position by a fraction of the reference dimension, thereby providing a simulation of a change in position relative to a scaled value of the reference dimension corresponding to a difference between the virtual recorded position and the virtual viewer position, thereby simulating a change in the viewer position relative to the immersive environment.

2. The immersive display system of claim 1, wherein:
    the two-dimensional image is generated by a photograph taken from the recorded position; and
    the processor is further configured to:
        map the two-dimensional image symmetrically about a virtual recorded location, such that the virtual recorded location corresponds to the recorded position in the immersive environment.

3. The immersive display system of claim 1, wherein the simulation of the change in position is based on a real-world movement of a viewer acquired via a motion input device forming a part of the immersive display system.

4. The immersive display system of claim 3, wherein viewer real-world movement translates into viewer virtual movement based on the scaled value providing the simulation of the change in position.

5. The immersive display system of claim 4, wherein the processor is further configured to:
    adjust the virtual display orientation with respect to the virtual viewer position by adjusting the scaled value.

6. The immersive display system of claim 5, wherein the scaled value is adjustable via input from the input device.

7. The immersive display system of claim 6, wherein the adjustability of the scaled value allows the input of real-world movement of the viewer to correspond to a different viewer virtual movement in response to changes in the scaled value.

8. The immersive display system of claim 7, wherein the input is configured to allow a viewer to adjust the scaled value in real time to tune the immersive display environment to the comfort of the viewer by allowing the viewer to adjust the scaled value in response to an experienced translation of real-world movement to viewer virtual movement.

9. The immersive display system of claim 1, wherein the two-dimension image is mapped to a virtual object.

10. The immersive display system of claim 9, wherein the virtual object includes a display radius that defines the reference dimension.

11. The immersive display system of claim 10, wherein the virtual object is a partial or full sphere defining a virtual display surface with the recorded position at approximately the center of the sphere and an interior surface of the sphere defining the immersive environment.

12. The immersive display system of claim 6, wherein the display device is updated in response to changes of the virtual viewer position is a selected virtual viewer position.

13. The immersive display system of claim 1, further comprising:
    tracking at least one actual translational location of the viewer along at least one translational degree of freedom of the viewer;
    determining changes in the at least one actual translational location of the viewer; and
    changing the virtual display orientation relative to the viewer virtual position based on the scaled value to mimic real-world movement of the viewer within the virtual environment based a real-world movement of the viewer.

14. The immersive display system of claim 13, wherein the input device tracks the viewer's real-world movement in six degrees of freedom including up/down, side-to-side, forward/backward, roll, pitch, and yaw.

15. The immersive display system of claim 14, wherein the viewer's side-to-side movement is represented in the display device by shifting an at least partially cylindrical or spherical image in the opposite direction of the viewer's real-world movement in response to the viewer's real-world movement.

16. The immersive display system of claim 15, wherein the two-dimensional display information is the at least one photographic image.

17. The immersive display system of claim 16, wherein the two-dimensional display information is a video.

18. The immersive display system of claim 1, wherein the viewer virtual position is limited to a control zone having a control radius.

19. The immersive display system of claim 18, wherein the control radius is 50% or less of the reference dimension.

20. The immersive display system of claim 1, wherein the viewing device is a head-mounted display (HMD) for adjustably displaying the two-dimensional display.

21. The immersive display system of claim 1, wherein the image is mapped onto the surface of the three-dimensional object via a projection from the virtual recorded position.

22. The immersive display system of claim 3, wherein:
   the input device is configured to receive an input from the viewer to select a selected viewer position; and
   the processor is configured to process the instructions for setting the viewer virtual position at the selected viewer position and updating the viewer position from the selected viewer position based on the real-world movement acquired via the motion input device.

* * * * *